July 17, 1934.     G. R. CASSAGNE     1,966,846
DRIVING DEVICE FOR PROPELLING VEHICLES
Filed Aug. 10, 1932     3 Sheets-Sheet 1

Inventor
Georges Raymond Cassagne
By C. F. Wenderoth
Atty

July 17, 1934. G. R. CASSAGNE 1,966,846
DRIVING DEVICE FOR PROPELLING VEHICLES
Filed Aug. 10, 1932 3 Sheets-Sheet 2
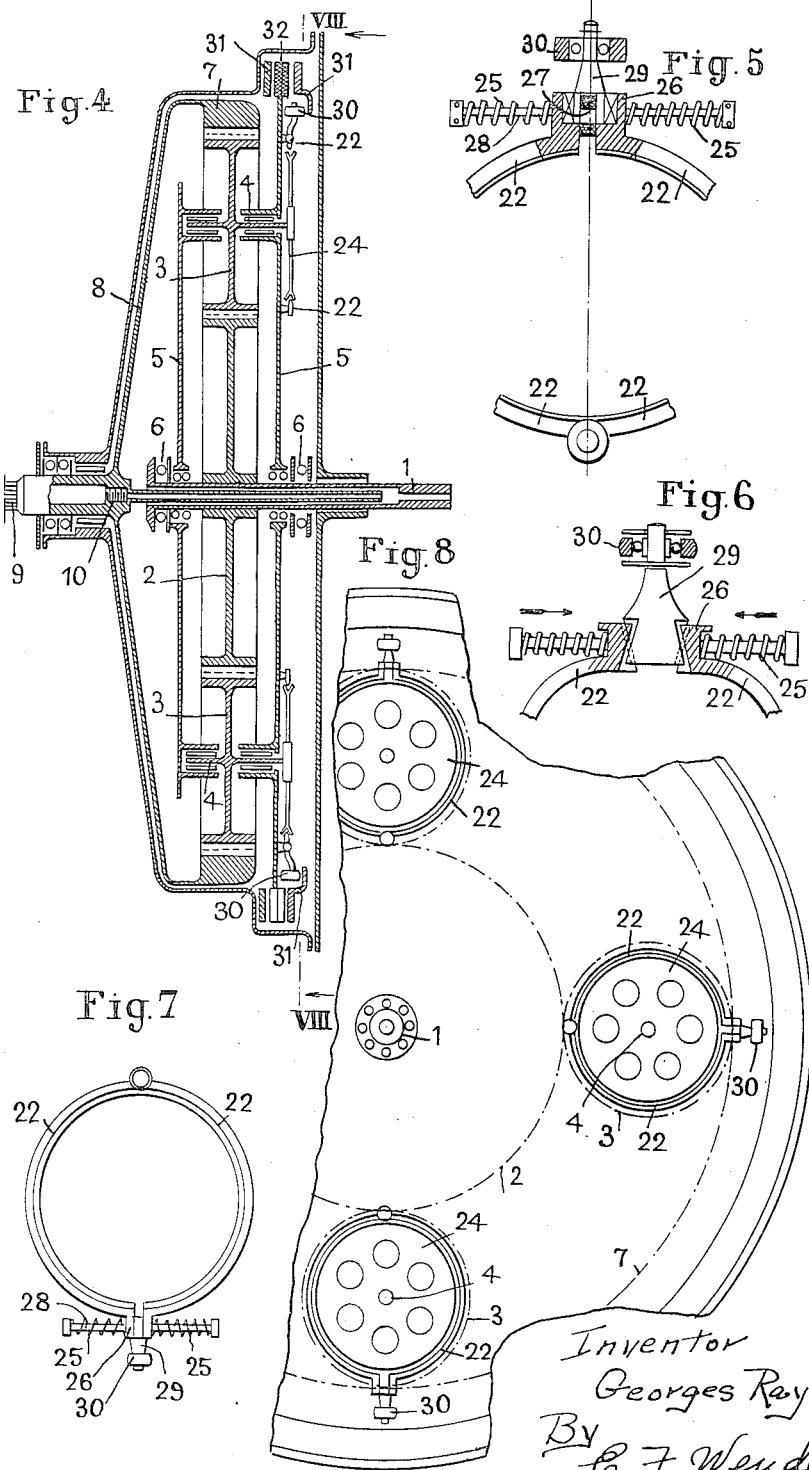

July 17, 1934.  G. R. CASSAGNE  1,966,846
DRIVING DEVICE FOR PROPELLING VEHICLES
Filed Aug. 10, 1932  3 Sheets-Sheet 3
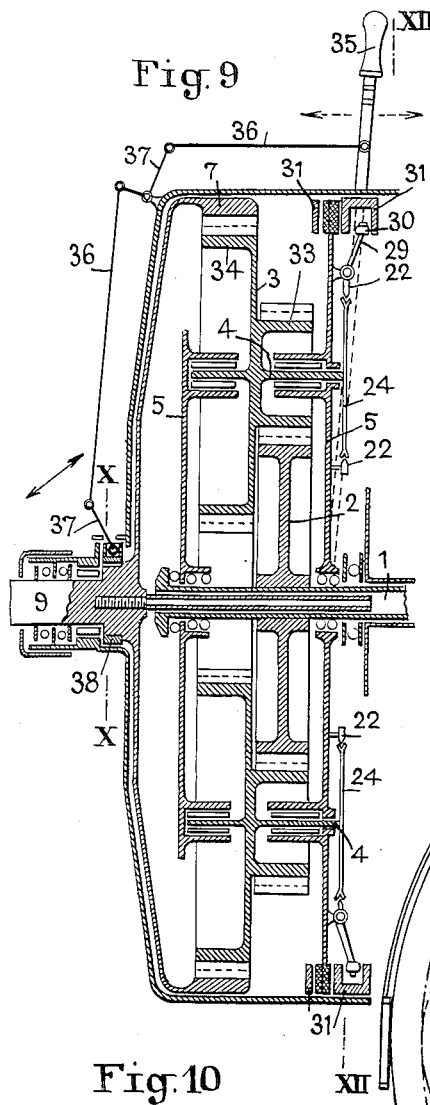
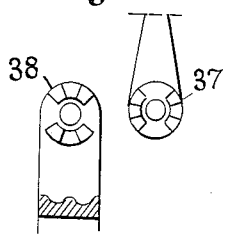
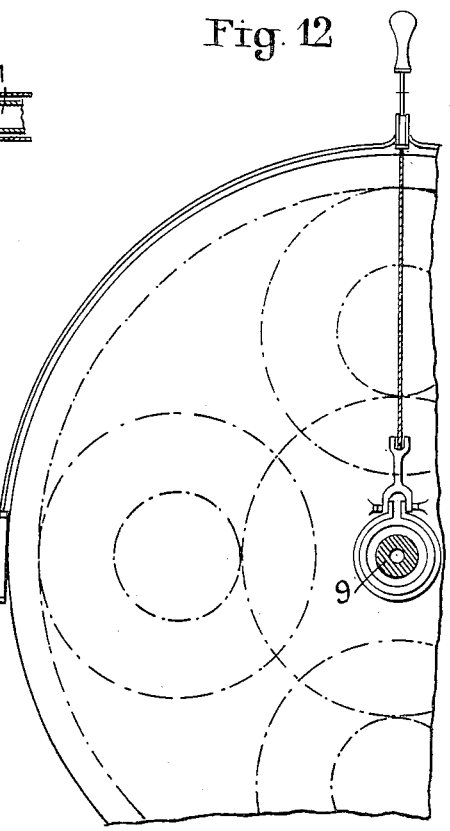
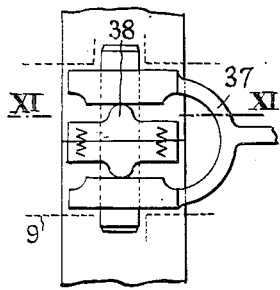
Inventor
Georges Raymond Cassagne
By E. F. Wenderoth
Atty Patented July 17, 1934

1,966,846

UNITED STATES PATENT OFFICE 1,966,846

DRIVING DEVICE FOR PROPELLING VEHICLES

Georges Raymond Cassagne, Cazaux, France

Application August 10, 1932, Serial No. 628,267
In France August 10, 1931

3 Claims. (Cl. 74—295)

My invention relates to driving devices for propelling vehicles.

It is more particularly characterized by the fact that between the driving shaft and the driven shaft which may be a propeller shaft or the like, are interposed gearing members comprising a differential mechanism or the like, the planet wheels of which are provided with a braking or retaining device directly controlled by the motor's driver, with a view of determining, according to the position given by said driver to the braking device, either the rotation of the propeller or the like at a speed either equal or different from the motor's speed in the same direction or in a reverse direction of the rotation of said motor, or the stopping of said propeller whatever may be the direction and the speed of rotation of said motor, or even the braking of the propeller by the motor.

In the accompanying drawings which show by way of example a preferred embodiment of the device according to my invention, for the application of same to aircraft, to motor road vehicles or to motor boats:—

Fig. 4 is a view similar to Fig. 1 of a modification in which the braking device is applied laterally.

Fig. 5 is a view similar to Fig. 2 of another braking device for the planet wheels.

Fig. 6 is a detail of a part of Fig. 5 partly in section.

Fig. 7 is a view of a braking ring.

Fig. 8 is a partial view along the line VIII—VIII of Fig. 4.

Fig. 9 shows a modification of Fig. 1 which may be applied to any kind of motor, more particularly for controlling a boat propeller.

Fig. 10 is a detail view of Fig. 9 along the line X—X of Fig. 9.

Fig. 11 shows the parts of Fig. 10 seen along the line XI—XI of Fig. 10.

Fig. 12 is a front view along the line XII—XII of Fig. 9.

The same reference characters appear on the several views showing similar parts.

Figure 1:
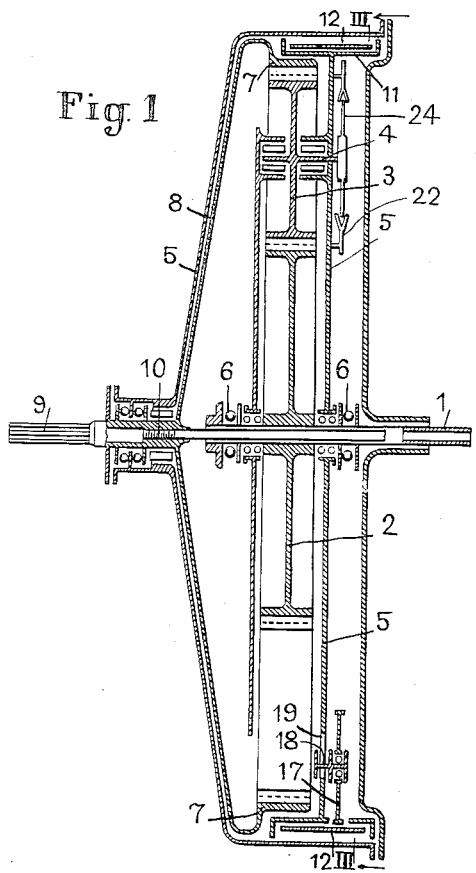
Fig. 1 is a diagrammatical axial section of the device which is to be mounted upon an aeroplane.

Keyed on the motor shaft 1 connected with a motor of any kind not shown in the drawings, is a sunwheel 2 constantly meshing with planet wheels 3 in any number (four in the example shown in the drawings) having pins 4, said pins being conveniently journalled in a plate-carter 5 which contains said sun wheel 2. The plate 5 is freely rotating upon shaft 1, the position of said plate being conveniently determined by means of abutments 6.

Planet wheels 3 are in constant mesh with a toothed ring 7, the body 8 of which is conveniently rigidly connected with the shaft 9 which is designed for receiving a propeller of convenient kind and dimensions.

Said shaft 9 is provided at its internal end with a screw threaded rod 10 which is accommodated by a convenient perforated part provided at the corresponding end of the motor shaft 1.

Arranged at the periphery of the carter plate 5, is a drum 11 (Fig. 1) for a braking band 12 provided with a convenient control device not shown in the drawings and having a controlling means located near the driver's hands.

In the carter plate 5 are provided a number of guiding slots 19 which each accommodate a pin 18 of a roller 17, the periphery of which is in a position to protrude through recesses of the drum 11.

Figure 2:
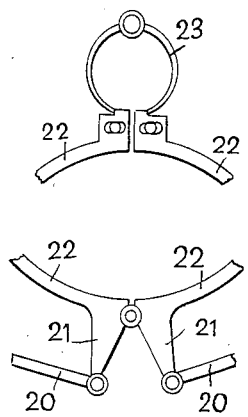
Fig. 2 is a detail view of a braking device, partly in section.
Figure 3:
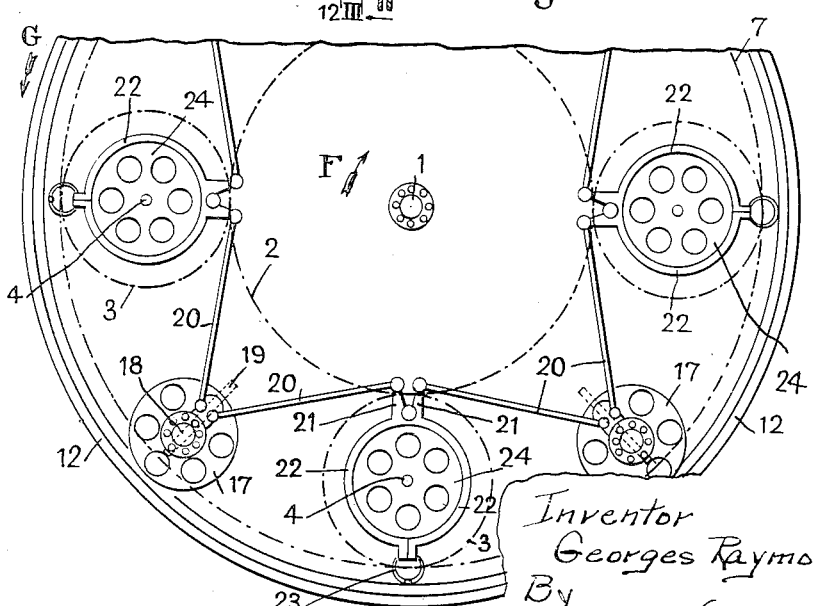
Fig. 3 is a part front view of the braking device along the line III—III of Fig. 1.

As shown more particularly in Fig. 3, every roller 17 is connected with rods 20 the free ends of which are connected, as shown in Fig. 2, with levers 21 of braking jaws 22 which surround disks 24. Each disk 24 is keyed on the pin 4 of the corresponding planet wheel 3. Every group of two jaws 22 thus constitutes a brake for the corresponding disk 24 and said group of jaws is provided with a spring 23 (Fig. 2) which always tends to bring said jaws in a braking position when applied against the periphery of disk 24.

The operation is as follows:—

The band 12 being applied against the periphery of drum 11 by means of the actuating member not shown in the drawings and operated by the motor driver, this drum 11 is thus prevented from rotating, the carter 5 being thus maintained stationary though shaft 1 is rotated by its motor not shown in the drawings. Said motor shaft causes the sun wheel 2 to rotate together with planet wheels 3. Shaft 1 rotating in the direction of arrow F of Fig. 3 together with sun wheel 2, the rotation of said wheel 2 is transmitted to planet wheels 3 which are free to rotate since, owing to the fact that the braking band 12 is applied against drum 11, the rollers 17 are forced towards shaft 1 (Fig. 3) thus causing through connecting rods 20, the jaws 22 to be spaced away from disks 24 in spite of springs 23, thus rendering said disks together with the corresponding planet wheels 3 free to rotate.

The toothed ring 7 and consequently shaft 9, is caused to rotate at a speed corresponding to the ratio of the gears in a direction reverse to that of the motor.

The band brake 12 being loosened, the carter 5 is caused to rotate together with shaft 1, planet wheels 3 do not rotate and are angularly displaced relatively to shaft 1, since the brake jaws 22 are applied upon the periphery of disks 24 by springs 23, so that the ring 7 and shaft 9 are rotated at the same speed and in the same direction as shaft 1.

When applied to an aeroplane for instance, the propeller being put in rotation through the resistance of air for instance when the aircraft is descending with its motor stopped, brake 12 being free, the carter 5 rotates together with the propeller, the self rotation of the propeller being thus obtained. On another hand, the rotation of said propeller shaft 9 is transmitted to motor shaft 1 through planet wheels 3 and sun wheel 2 as soon as brake 12 is applied against drum 11. It is thus possible to start the motor when flying, said starting being effected automatically by simply decompressing the cylinders of the motor by any well-known means. It is thus possible, due to the arrangement described, to positively actuate the propeller through the motor for instance for the propulsion at a given speed which is determined by the ratio of gearing.

The propeller could also be actuated by the motor at the same speed as said motor but in a reverse direction which allows at the time of landing of an aircraft, to reverse the direction of rotation of said propeller, thus causing a very powerful braking to be produced, thus preventing any danger of turning over when landing, thus preventing a great number of flying accidents.

The descending of aircraft may also be slow by causing the motor to be rotated by the propeller, such arrangement thus considerably increasing the safety of flying of aircraft.

In the modification of Figs. 4 to 8, the braking jaws 22 are brought to their braking position by means of coil springs 25 (Figs. 5, 6 and 7) which act upon parts 26 of said jaws. A lever 29, located between said parts 26, is pivoted on a rod 28 which guides said springs 25. Said lever is provided with two helical faces which, when said lever 29 is caused to rotate round said rod 28, cause the brake members 22 to be spaced away from disks 24. A roller 30 located upon said lever 29 is arranged in the path of the braking ring 31.

In the constructional form of Figs. 4 to 8, said braking ring comprises two parts located on either side of the periphery 32 of plate 5. In this embodiment, the braking is operated by gripping the periphery 32 of said plate 5. When tightening said rings 31 on the lateral sides of 32, the rollers 30 are depressed thus causing levers 29 to swivel round rods 28 thus compressing springs 25 and spacing apart braking jaws 22 and rendering disks 24 free. The operation is thus similar to the one described with the constructional form of Figs. 1, 2, 3.

In the constructional form of Figs. 9 to 12, the sun wheel 2 is in constant mesh with planet wheels 3 which comprise each, as shown in Fig. 9, two toothed parts 33 and 34 in mesh with sun wheel 2 and toothed ring 7 respectively. The disks 24 which are solid with said planet wheels 3 are provided with braking jaws 22 provided, as in the constructional form of Figs. 4 to 7, with directing rollers 30, said rollers, in this modification, entering a circular groove 31. Said groove 31 is provided with a controlling lever 35 which is to be controlled by the motor driver. Said lever 35 is connected by means of connecting rods 36 to bell cranks 37 with an auxiliary brake 38 which is applied upon the hub of the toothed ring 7.

In this arrangement as in the former ones, the brakes 31 and 38 being loosened, jaws 22 prevent planet wheels 3 from rotating, the plate 9 rotates together with the motor shaft 1 and in the same direction as said shaft thus causing ring 7 and shaft 9 to rotate in the same direction and at the same speed as the motor.

If the lever 35 is brought in a position for applying the double ring upon the periphery of plate 5 thus preventing the same from rotating, the braking jaws 22 are loosened thus allowing planet wheels 3 to rotate. The same cause ring 7 to rotate and to transmit to shaft 9 a movement of rotation in the direction reverse from that of the motor.

For stopping shaft 9, while keeping shaft 1 in rotation, the braking rings 31 allow plate 5 to rotate, the rollers 30 and their levers 29 are brought in a position for which the jaws 22 are spaced away from the corresponding disks, so that planet wheels 3 are free to rotate.

The auxiliary brake 38 located as shown in Fig. 10, being brought in the intermediate position shown in said figure, causes brake jaws 38 to be applied against the hub of the ring 7, thus preventing said ring from rotating. The plate 5 thus loosely rotates together with the planet wheels thus acting as a fly wheel for the motor.

This latter arrangement renders it possible to do away with the clutch and the fly wheel of the motor and to realize a complete stopping of the propelling or other driven member, said member being thus in a position to be rotated in the direction or in the reverse direction of the rotation of the motor, whilst the noise of operation is greatly reduced.

In each of the embodiments shown in the drawings, the controlling device may be actuated by the pilot of the aircraft or the motor driver and it may be connected with one of the usual controlling devices of the motor as for instance the lever controlling the fuel admission.

In its application to aircraft, above device renders it possible:—

1. To operate at speed reducing device,
2. To lengthen the gliding flight due to the free rotation of propeller which allows at the pilot's will to avoid the brake produced by the propeller.
3. To brake descending flights and to increase the descending angle of inclination without increasing the speed of airplane relatively to the ground.
4. To reduce in a large proportion the rolling upon the ground when landing.
5. To prevent in most cases aircraft to turn over, due to the reaction exerted upon the air along the axis of traction.
6. To suppress the effects of the propeller torque due to the balancing, upon the driving axis, of both propeller and motor torque which, during the normal operation, that is to say during forward flight, are of reverse directions.

What I claim is:—

1. In a driving device for propelling vehicles of any kind, a driving shaft, a sun wheel keyed on said shaft, planet wheels in permanent mesh with said sun wheel, a carter plate loosely mounted on said driving shaft, means controlling said carter plate, pins journalled in said carter plate, and solid with said planet wheels, a toothed ring in permanent mesh with said planet wheels, a plate solid with said toothed ring, a driven shaft accommodating said plate and rotating with same, braking disks keyed on pins of said planet wheels, braking jaws surrounding said braking disks, and means for resiliently applying said jaws upon said disks, and means for loosening said disks, thus causing said driven shaft to rotate at the same or a different speed.

2. In a driving device for propelling vehicles of any kind, a driving shaft, a sun wheel keyed on said shaft, planet wheels in permanent mesh with said sun wheel, a carter plate loosely mounted on said driving shaft, means controlling said carter plate, pins journalled in said carter plate, and solid with said planet wheels, a toothed ring in permanent mesh with said planet wheels, a plate solid with said toothed ring, a driven shaft accommodating said plate and rotating with same, braking disks keyed on pins of said planet wheels, springs resiliently applying said jaws upon said disks, and means for loosening said disks, thus causing said driven shaft to rotate at the same or a different speed.

3. In a driving device for propelling vehicles of any kind, a driving shaft, a sun wheel keyed on said shaft, planet wheels in permanent mesh with said sun wheel, a carter plate loosely mounted on said driving shaft, pins journalled in said carter plate, and solid with said planet wheels, a toothed ring in permanent mesh with said planet wheels, a plate solid with said toothed ring, a driven shaft accommodating said plate and rotating with same, braking disks keyed on pins of said planet wheels, springs resiliently applying said jaws upon said disks, a braking rim on said carter plate, means for applying a frictional braking upon said rim, levers connected with said means and with said braking jaws, in opposition with said applying springs, thus causing said driven shaft to rotate at the same or a different speed, and in the same or a reverse direction as the motor shaft.

GEORGES RAYMOND CASSAGNE.